United States Patent
Staggs

(10) Patent No.: US 7,179,045 B2
(45) Date of Patent: Feb. 20, 2007

(54) SELF CLEANING HYDRO DELIVERY SYSTEM

(76) Inventor: Leland Wayne Staggs, 103 Kalse Rd., Lawrenceburg, TN (US) 38464

( * ) Notice: Subject to any disclaimer, the term of this patent is extended or adjusted under 35 U.S.C. 154(b) by 72 days.

(21) Appl. No.: 11/157,045

(22) Filed: Jun. 20, 2005

(65) Prior Publication Data

US 2005/0281664 A1    Dec. 22, 2005

Related U.S. Application Data

(60) Provisional application No. 60/580,589, filed on Jun. 18, 2004.

(51) Int. Cl.
*F03B 13/12* (2006.01)
(52) U.S. Cl. .................. 415/3.1; 415/4.3; 415/121.2
(58) Field of Classification Search ............... 415/3.1, 415/4.1, 4.3, 4.5, 121.2; 405/75, 77
See application file for complete search history.

(56) References Cited

U.S. PATENT DOCUMENTS 1,374,945 A * 4/1921 Murray .................. 405/77

FOREIGN PATENT DOCUMENTS

CH        673668 A5 * 3/1990
JP        01253570 A  * 10/1989

* cited by examiner

*Primary Examiner*—Edward K. Look
*Assistant Examiner*—Dwayne J White
(74) *Attorney, Agent, or Firm*—Stanley K. Pierchoski

(57) ABSTRACT

A system for supplying a fluid to a turbine includes an inlet for allowing the fluid to enter the turbines, a filter to filter the fluid, and a pump apparatus to pressurize the fluid and to mix the pressurized fluid with the un-pressurized fluid at a location in the neighborhood of the inlet.

16 Claims, 8 Drawing Sheets

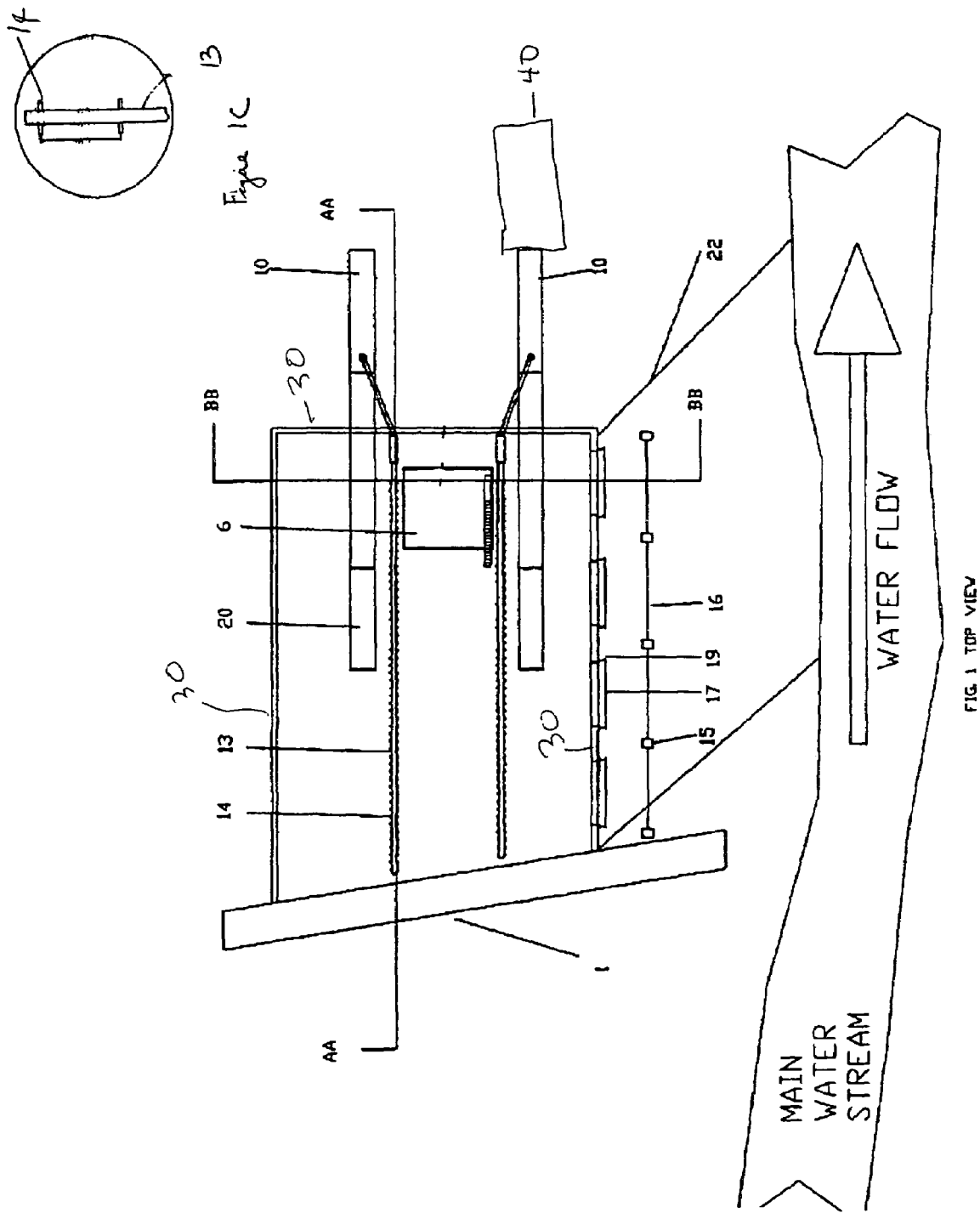

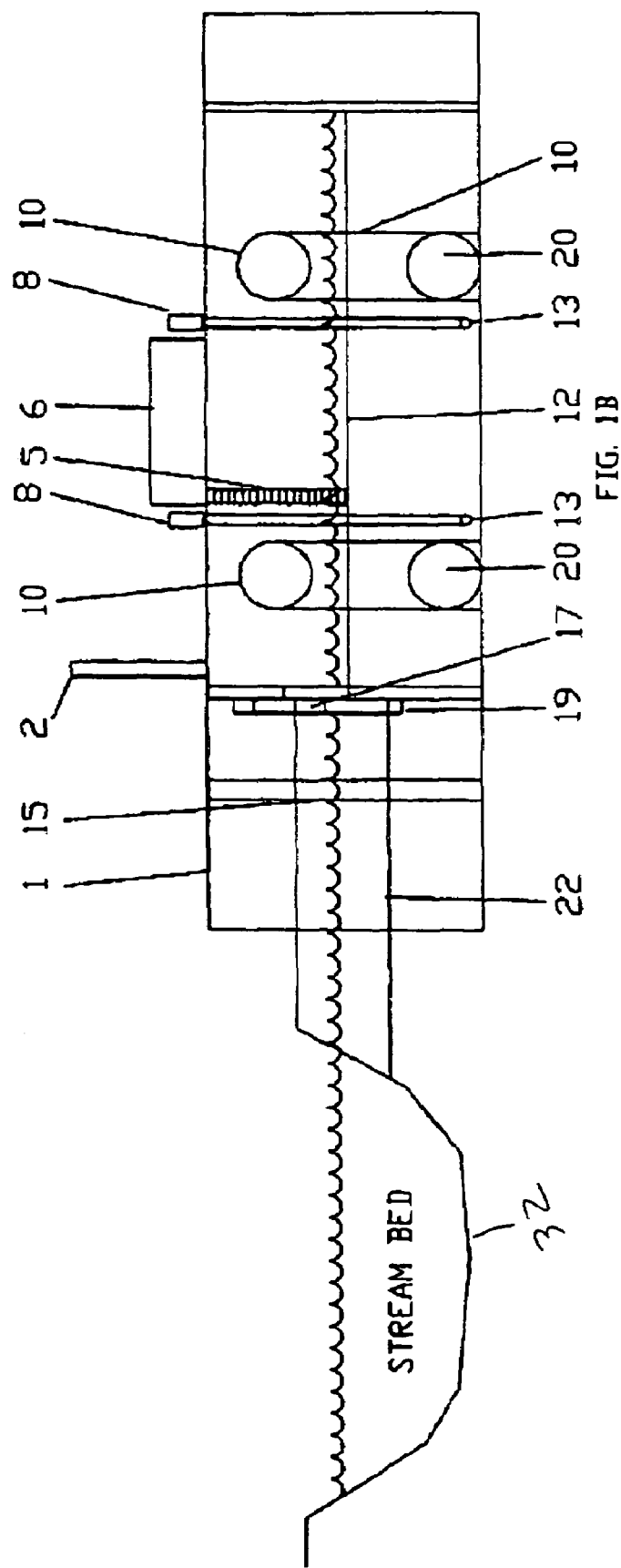

SELF CLEANING HYDRO DELIVERY SYSTEM

PRIORITY

The present invention claims priority based on 35 USC 119 for provisional application Ser. No. 60/580,589 filed on Jun. 18, 2004.

FIELD OF THE INVENTION

The present invention relates to a cleaning system and in particular to a self-cleaning Hydro system.

BACKGROUND OF THE INVENTION

The industrial society of today depends substantially on a source of economical electric power. Most of these sources of electric power are not renewable and as a consequence, are increasingly expensive for the consumer. Additionally, many of these sources of electric power pollute the environment and are undesirable from this aspect. The pollution may include many forms of harmful byproducts such as smoke and airborne particles of harmful dust for example from coal burning plants and carbon dioxide from gas burning facilities. The coal burning plants use coal as a fuel which is provided for example by strip mining which can cause massive environmental disturbances. Electric power can be obtained from nuclear generating step plants. However, nuclear generating plants have created public hostility and fear, and in addition, these nuclear generating plants have experienced exploding construction costs and has an additional problem of disposing of spent radioactive fuel rods. Typically, the nuclear, coal-fired, or gas-fired generation plants require large centralized generating facilities with huge transmission infrastructure.

Hydroelectric power is environmentally clean to produce electricity but can be very expensive and environmentally disruptive to install. These conventional hydroelectric plants can only be situated on large rivers with sufficient flow and fall which is the distance the water must drop to build up energy enough to turn a turbine. Usually, hydroelectric power requires constructing a large dam across the river and a large centralized generating facility with expensive transmission network to transmit the generated power to the consumer. Necessarily, such a dam radically alters the landscape.

What is required is a source of electric power that is economical, renewable and will not alter the landscape to any great degree.

SUMMARY OF THE INVENTION

The self-cleaning Hydro delivery system of the present invention does not require a dam, and consequently there is no impact on the surrounding landscape. The self cleaning hydro delivery system can be located beside a stream where the water table has a high-rise, at the top of a waterfall or adjacent to a mountain (The present invention can be used even though the water to the system may have to run uphill.) The self-cleaning hydro delivery system requires no central facility or long transmission network because it can be installed at the location of the consumers. Furthermore, the present system is nonpolluting since it does not require any nonrenewable resource, and it does not require a dam, heavy capital expenditures and does not change the landscape. The system of the present invention has minimal environmental impact.

Hydroelectric power converts the kinetic energy of falling (moving) water into electric energy by running the water through a turbine. The water turns the turbine which in turn spins a generator which converts the kinetic energy into electricity. The self-cleaning hydro delivery system includes a building which may be rectangular and may have a high impact wall at one end of the building to protect the building. The building can be constructed of block, concrete or steel or any other suitable material. Water enters the building by one or more water inlet doors which our constructed several feet below the water level. The building includes a grate floor which may cover the entire surface of the building to catch debris from the water source. The grate includes holes to allow the water to flow through while retaining the debris. The size of the holes can be varied in order to accommodate the tolerances of the turbines. The water flow can be regulated by inlet doors which are movable and suspended by cables over openings. The water from my stream or river may include a large amount of mud, sand or other debris suspended within the water. High pressure nozzles stir the water so that it does not congeal to cause a problem for the turbines. These high-pressure nozzles are connected to a high pressure pump which may be located on the top of the facility.

BRIEF DESCRIPTION OF THE DRAWINGS

FIG. 1 illustrates a top view of the self cleaning hydro delivery system;

FIG. 1b illustrates another cross-sectional view of the self-cleaning hydro delivery system;

FIG. 1c illustrates another cross-sectional view of the self-cleaning hydro delivery system;

DETAILED DESCRIPTION

Figure 1A:
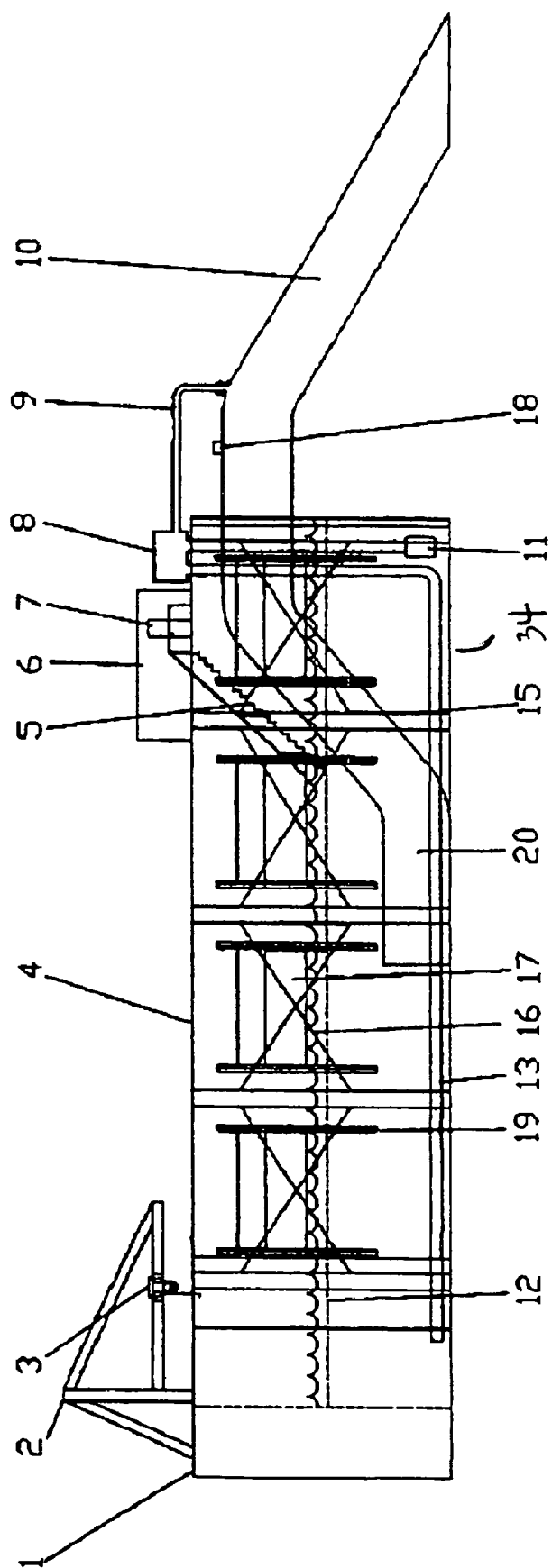
FIG. 1a illustrates a cross-sectional view of the self cleaning hydro delivery system.

FIG. 1 shows the self-cleaning hydro delivery system 100 which includes structure walls 30 and a high impact wall 1 to provide additional protection for the system 100 from the debris that flows in the water stream 32 under high volume conditions. Positioned along the waterside wall 30 are several guard beams 15 which are secured in the bank of the water stream 32 and support interlocking cables 16 which may be made from steel to the prevent large debris from entering the self cleaning hydro delivery system 100. The waterside wall 30 includes at least one water inlet door 17 which opens and closes to regulate the amount of water from the water stream 32 that enters the self cleaning hydro delivery system 100. The support interlocking cable 16 is positioned in front of the water inlet door 17. FIG. 1 shows a water inlet trough 22 to allow water to flow from the water stream 32 to the water inlet door 17. The water inlet trough 22 could be replaced with other means such as a pipe to convey water from the water stream 32 to the water inlet door 17. The principles of the invention are applicable to other fluids including water FIG. 1 additionally shows an inlet pipe 10 which connects the self-cleaning hydro delivery system 100 with the turbine 40 to convey clean water to the turbine 40 which powers the electric generator (not shown). The inlet pipe 10 is shown substantially parallel to the longitudinal direction of the self-cleaning hydro delivery system 100, but other orientations for the inlet pipe 10 are within the scope of the present invention. A high pressure fluid line 13 is shown positioned along the inlet pipe 10 and includes self-cleaning nozzles 14 for self cleaning. The high-pressure fluid line 13 is connected to the inlet pipe 10 downstream as a source of clean water. FIG. 1 shows two high pressure flush lines 13, but one or more than two are within the scope of the present invention. FIG. 1 shows a maintenance office 6 with a door 7 positioned between the high-pressure fluid lines 13. However, the location of the maintenance office 6 could be anywhere in the self-cleaning hydro delivery system.

FIG. 1a shows a cross-sectional view along the line A—A as shown in FIG. 1. A slide track 19 is mounted on waterside wall 30 to provide a track for the water inlet door 17 so that the water inlet door 17 can be opened and closed. The interlocking cables 16 are shown positioned in an X pattern, but other patterns could be used. The water inlet door 17 is connected to support cables 21 so that the water inlet door 17 can be opened and closed. The grate floor 12 is a filter and is shown below the water line and includes holes so that the water may pass through and the debris is filtered out and remains on the grate floor so that only debris free water is sent to the turbine. Inlet pipe 10 includes an inlet pipe opening 20 so that clean water may enter the inlet pipe 10. While FIG. 1b shows the inlet pipe 10 rising above the water level, other configurations are possible.

Near the high impact wall 1, a trolley crane mount 2 is positioned and includes a trolley crane 3 to lift large debris from in front of the waterside wall 30. The grate floor 12 is shown that extending from one end of the self cleaning higher hydro delivery system to the other. However, the grate floor 12 could cover a portion of the self-cleaning hydro delivery system 100. A back flush and primer pump 8 is used to pump water from the inlet pipe 10 to the high pressure flush pipe 13 and to the self-cleaning nozzles 14. Thus, when the back flush and primer pump 8 is activated, the self-cleaning nozzles 14 spray water on to the bottom 34 which will mix the water before it enters the opening 20.

A suction line 11 is connected to back flush and primer pump 8 to suction water near the bottom 34 of the self-cleaning hydro delivery system 100. This suction action from the suction line 11 aids in mixing the water.

FIG. 1b shows an end view of the self cleaning hydro delivery system 100 opposite to the high impact wall 1. The high pressure flush line 13 is positioned adjacent to the inlet pipe 10 so that the self-cleaning nozzles 14 can spray water in the neighborhood and near the opening of the high-pressure flush line 13. Additionally shown is the water inlet trough 22 extending from the water stream 32 to the waterside wall 30 and the water inlet doors 17 to allow water from the water stream 32 to flow to the water inlet door 17. Additionally, FIG. 1b shows stairs 5 extending from the a maintenance office 6 to the grate floor 12 so that the operators of the self-cleaning hydro delivery system 100 can descend from the maintenance office 6 to the grate floor 12.

FIG. 1c shows details of the high-pressure self-cleaning nozzle 14 and the high pressure flush line 13.

Figure 2:
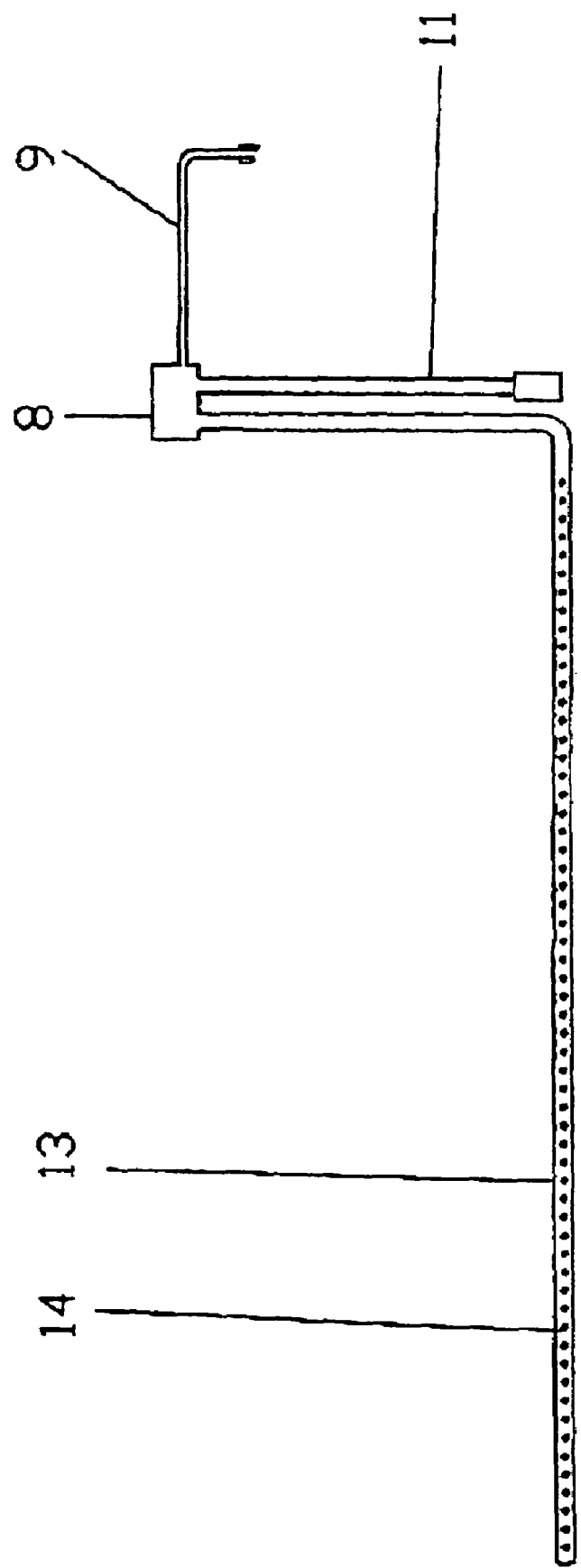
FIG. 2 illustrates a side view of the high-pressure sediment nozzle and primer pump of the self-cleaning hydro delivery system.

FIG. 2 shows the high-pressure self cleaning nozzle 14 and the back flush and primer pump 8 of the self-cleaning Hydro delivery system 100. The high pressure self cleaning nozzle 14 is connected to high pressure flush line 13. Water is pumped from the supply line 9 and suctioned from the suction line 11 to the back flush and primer pump 8 and the back flush and primer pump 8 pumps the water to high pressure flush line 13.

Figure 3:
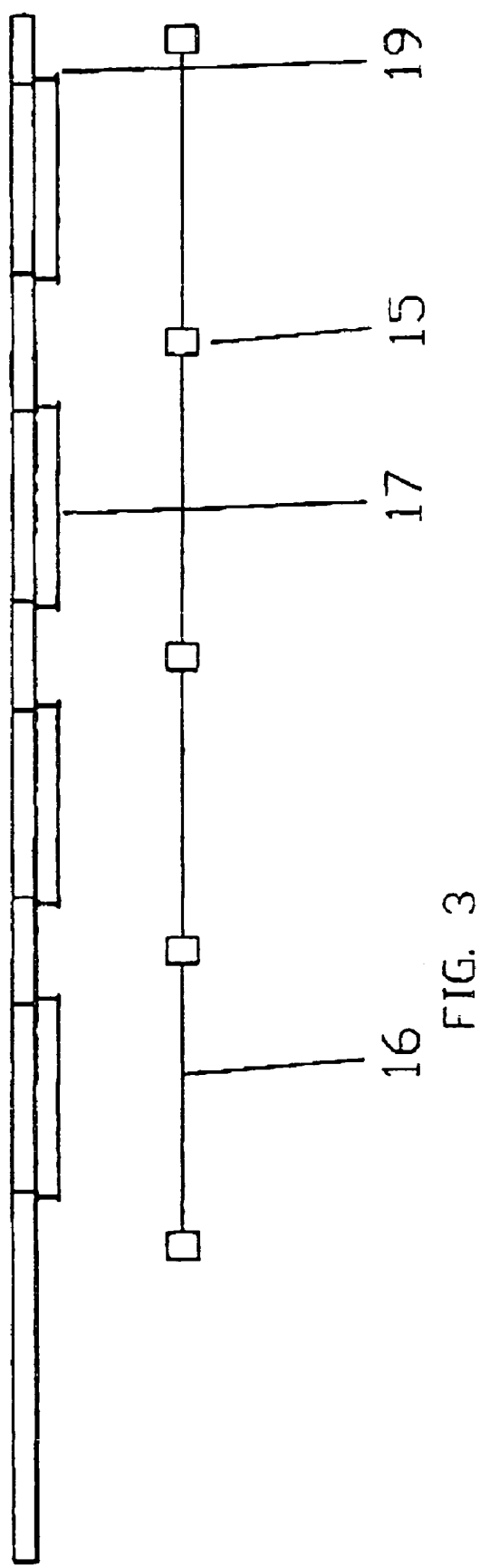
FIG. 3 illustrates a top view of the water inlet doors of the self-cleaning hydro delivery system.

FIG. 3 shows the relationship between the water inlet doors 17 and the guard beams 15 with respect to the interlocking cable 16 to prevent large pieces of debris from entering the self-cleaning hydro delivery system 100. The guard beams 15 support the interlocking cable 16.

Figure 4:
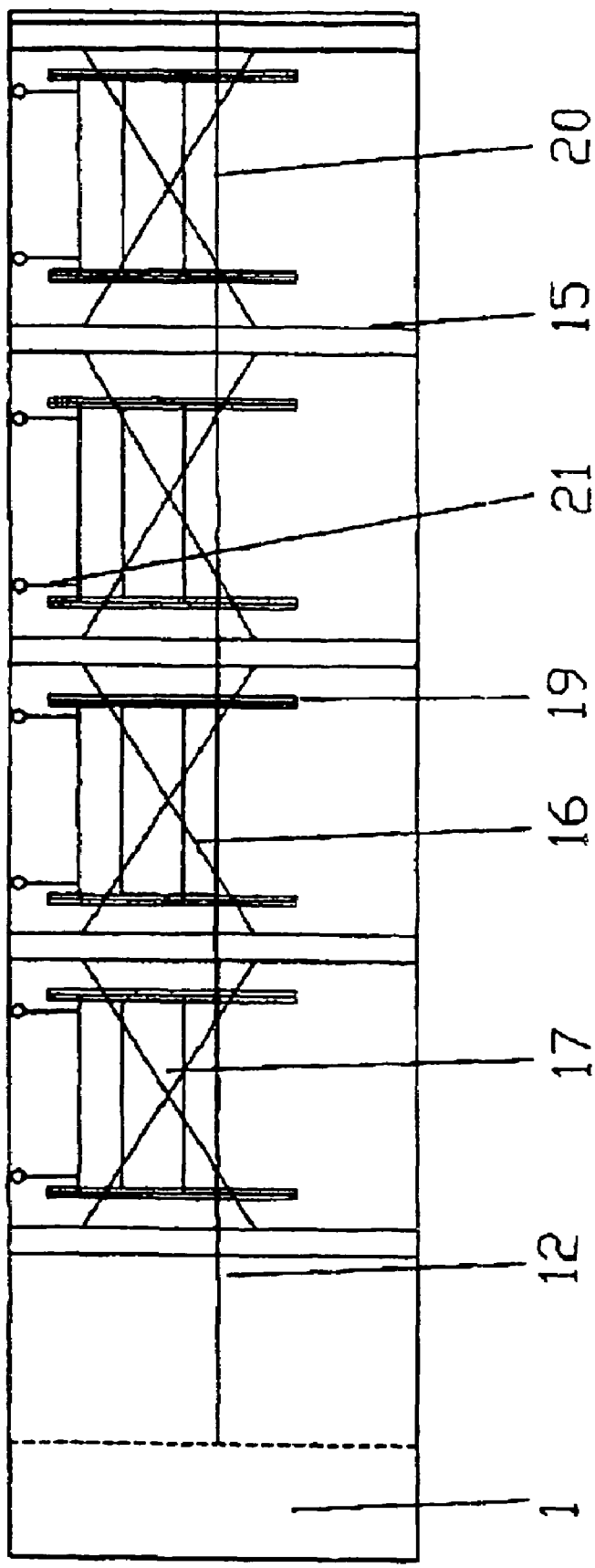
FIG. 4 illustrates a side view of the water inlet doors of the self-cleaning hydro delivery system.

FIG. 4 shows support cables 21 to lift and lower the inlet doors 17 thereby adjusting the amount of water that can enter the self-cleaning hydro delivery system 100 through water inlet opening 20. The inlet door 17 moves up and down on the slide track 19. Other apparatus and methods could be used to control the amount of water that can enter the self-cleaning hydro delivery system 100. FIG. 4 additionally shows the grate floor 12 is positioned so that the water can flow through the grate floor 12 once the water has entered the self cleaning hydro delivery system 100.

Figure 5:
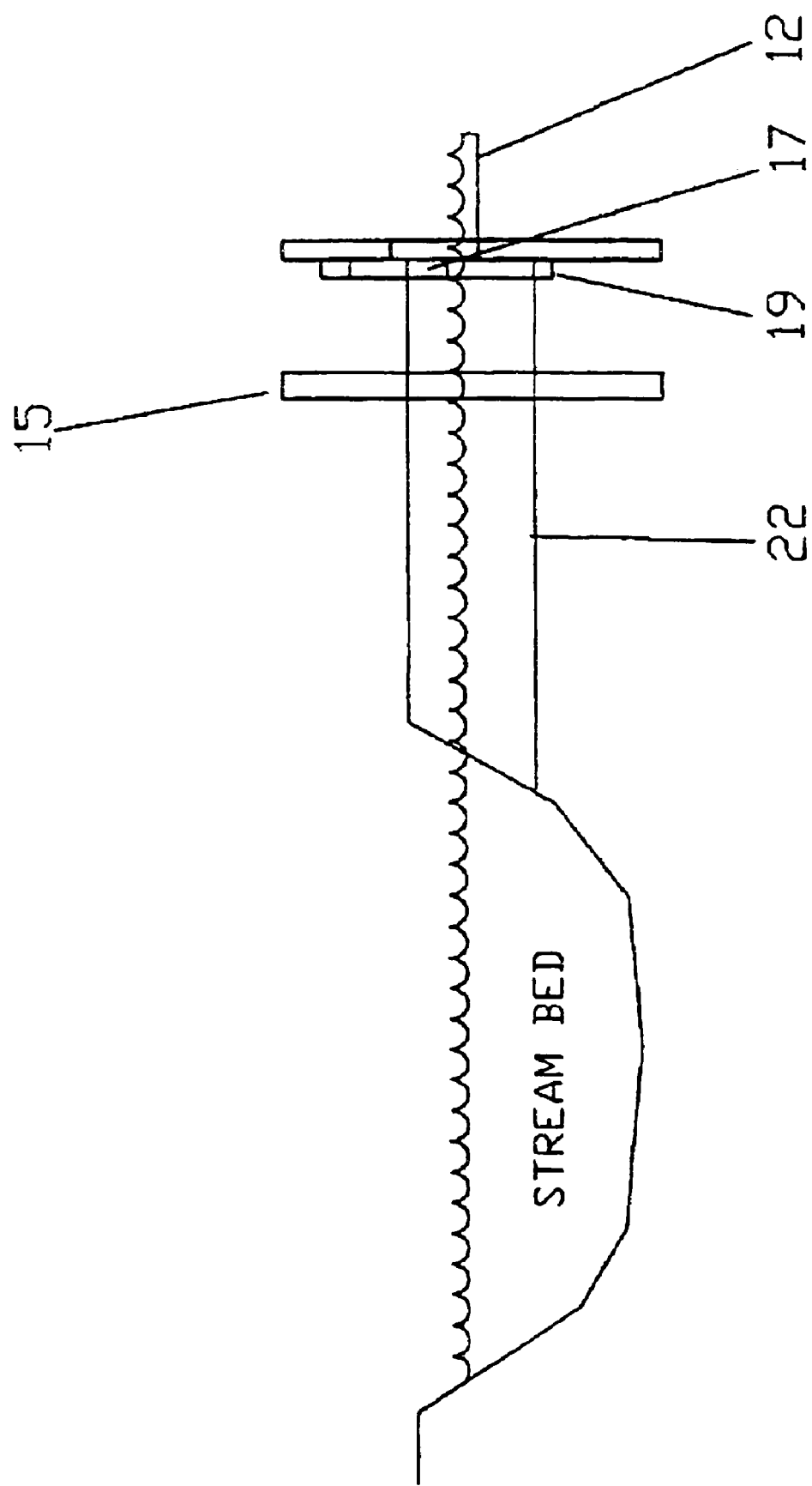
FIG. 5 illustrates an end view of the water inlet feed trough of the self cleaning hydro delivery system.

FIG. 5 shows the water trough 22 below the surface of the water and the inlet door 17 positioned partially below the surface of the water. Also the grate floor 12 is positioned below the surface of the water.

Figure 6:
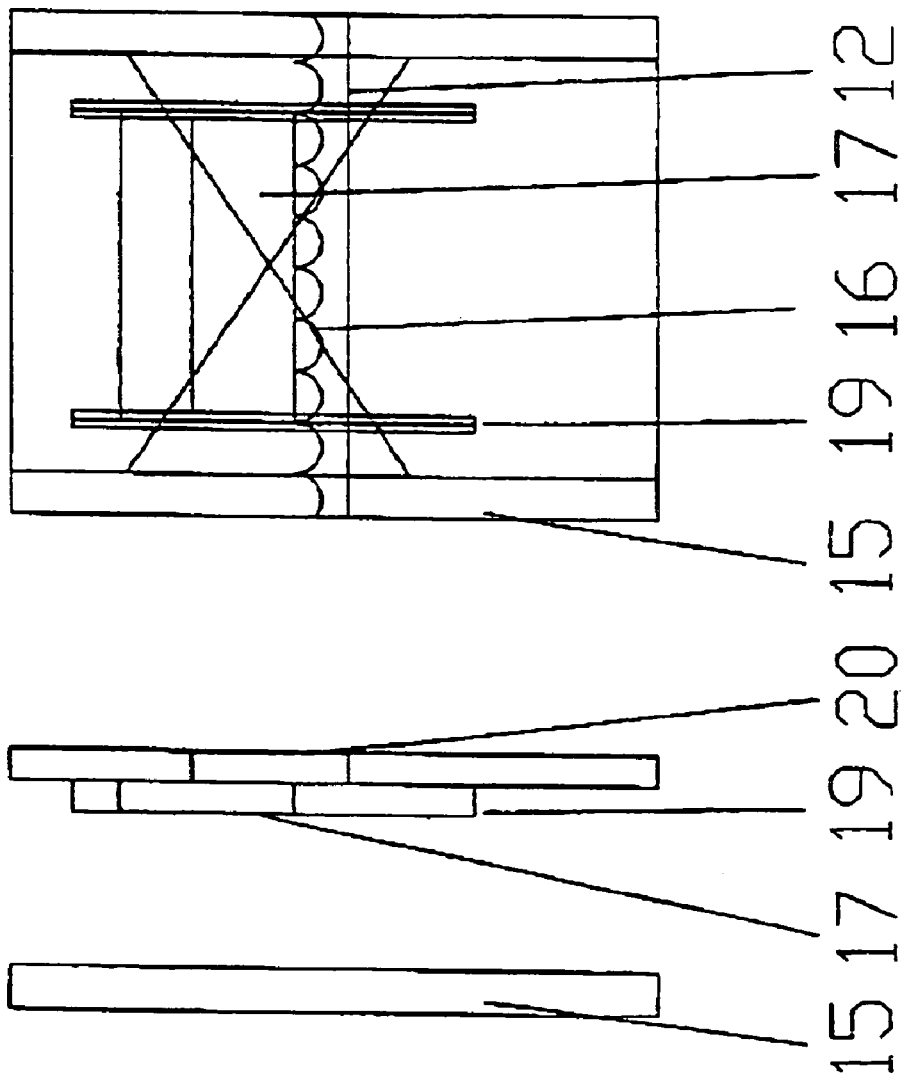
FIG. 6 illustrates a detail of the inlet opening area of the self-cleaning hydro delivery system.

FIG. 6 shows the details of the water inlet opening 20. The surface of the water 16 is located above the grate floor 12 so that the water 16 can drain through the holes in the grate floor 12. The water inlet opening 20 is protected by the interlocking cable 16 which is positioned directly in front of the water in the opening 20. The interlocking cable 16 is supported by the guard beams 15, and the interlocking cable 16 is formed in a substantially X shape. However, other configurations for the interlocking cable 16 are within the scope of the present invention.

While the present invention has been described in terms of various embodiments, it should be understood that variations on the disclosed aspects of the present invention are within the scope of the present invention.

The invention claimed is:

1. A system for supplying a fluid to a turbine, comprising:
   an inlet for allowing said fluid to enter said turbine;
   a filter to filter said fluid; and
   a pump apparatus to pressurize said fluid and to mix said pressurized fluid with said un-pressurized fluid at a location in the neighborhood of said inlet.

2. A system for supplying a fluid to a turbine as in claim 1 wherein said pump apparatus includes a suction pump to suction said fluid.

3. A system for supplying a fluid to a turbine as in claim 2 wherein said mixing is at substantially the same location as said suction.

4. A system for supplying a fluid to a turbine as in claim 2 wherein said suction and mixing are at an opening of said turbine.

5. A system for supplying a fluid to a turbine as in claim 1 wherein said pump apparatus obtains said fluid downstream of where said pressurized fluid and said fluid are mixed.

6. A system for supplying a fluid to a turbine as in claim 1 wherein said pumping apparatus includes a self-cleaning nozzle.

7. A system for supplying a fluid to a turbine as in claim 1 wherein said filter is a floor.

8. A system for supplying a fluid to a turbine as in claim 1 wherein floor is a grate.

9. A method for supplying a fluid to a turbine, comprising the steps of:
   allowing said fluid to enter said turbine,
   filtering said fluid
   pressurizing said fluid and mixing said pressurized fluid with said un-pressurized fluid at a location in the neighborhood of an inlet of said turbine.

10. A method for supplying a fluid to a turbine as in claim 8 wherein said method includes the step of suctioning said fluid.

11. A method for supplying a fluid to a turbine as in claim 10 wherein said mixing is at substantially the same location as said suction.

12. A method for supplying a fluid to a turbine as in claim 10 wherein said suction and mixing are at an opening of said turbine.

13. A method for supplying a fluid to a turbine as in claim 9 wherein said fluid is obtained downstream of where said pressurized fluid and said fluid are mixed.

14. A method for supplying a fluid to a turbine as in claim 9 wherein said pumping apparatus includes a self-cleaning nozzle.

15. A method for supplying a fluid to a turbine as in claim 9 wherein said filter step uses a floor as the filter.

16. A method for supplying a fluid to a turbine as in claim 15 wherein floor is a grate.

\* \* \* \* \*